3,124,123
PILOT RESTRAINT SYSTEM
Earl A. Kops and Hugo F. Mohrlock, Jr., San Diego, Calif., assignors to General Dynamics Corporation, San Diego, Calif., a corporation of Delaware
Filed Dec. 30, 1958, Ser. No. 783,907
4 Claims. (Cl. 128—1)

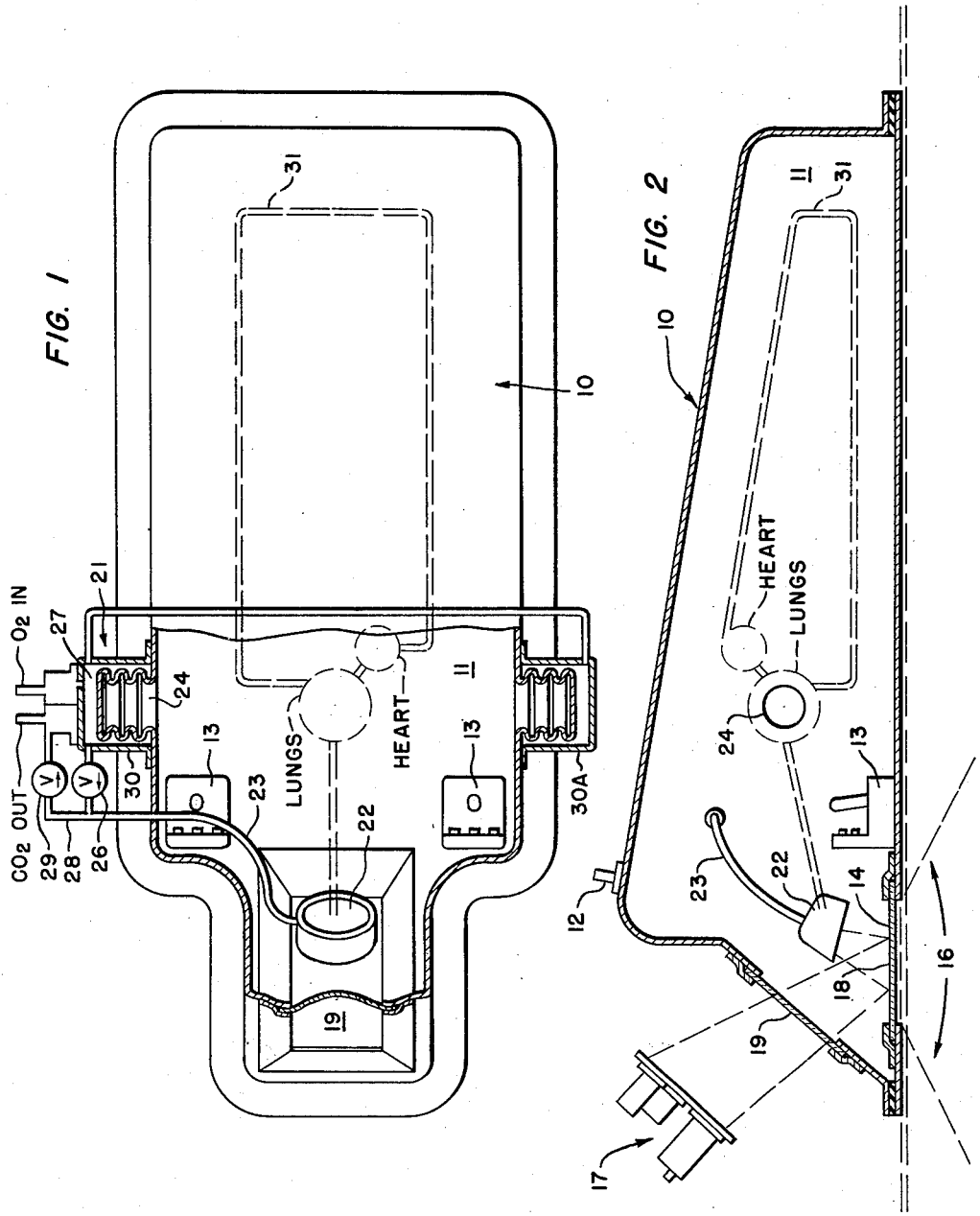

This invention relates to pilot restraint systems and more particularly to a fluid filled rigid pilot housing container which will increase the pilot's upper limits of human tolerance to acceleration.

Hydrodynamic disturbances of circulation as well as the acceleration effect on the sensorium and central nervous system, particularly with respect to kinesthetic, vestibular, and visual functions present a hazard to survival during high accelerations. Human tolerances to accelerations are lower than accelerations possible to be experienced in present day high speed aircraft, manned rockets and space vehicles. With each new advance in design the gap between the human tolerance level and the aircraft potential is increased. This is particularly true during high cyclic and eccentric tumbling and spinning following emergency seat ejection from these high performance aircraft, for example.

The problem related to the human body is of direct displacement of intercellular fluids, changes in hydrostatic equilibrium between capillaries and the interstitial medium, structural failure of blood vessels, and deformation of body structure. If the human body is suspended in a fluid medium of the same density as the body, the body weight would be reduced essentially to zero. Under this condition an accelerative force in any direction would create a hydrostatic pressure within the fluid of the same magnitude as the hydrostatic pressure in the human body, thus maintaining equilibrium. Since blood has a density of 1.055, suspension of the pilot in a fluid capsule filled with a saline or other solution is the concept advanced in the present invention.

Heretofore pressurized flying suits have been used to prevent the rush of blood toward one end or the other of the body under rapidly changing conditions of motion. In one such suit, water was placed between the inner and outer layers of the garment, the theory being that water in the garment would also tend to flow in the same direction as the rush of blood, thereby exerting more pressure at that end of the body to thereby retard this surge of blood flow. However, it has been found that this type of pressurization is inadequate for extreme acceleration forces, such as 80 G's for example. Under such conditions both the blood and the water would flow to one end, great discomfort is felt by the pilot, the pilot has no control over his limb movement and he is completely helpless.

The pilot restraint system comprising the present invention consists of a rigid fluid tight container entirely encapsulating the pilot. The container has provision for filling and emptying of fluid, supplying the pilot with oxygen, providing for viewing of instruments and manipulation of controls.

It is therefore an object of this invention to provide for an improved pilot restraint system for raising the upper limits of human tolerance to acceleration.

It is another object to provide for a rigid fluid filled pilot housing container which permits the pilot to control his aircraft.

Another object is the provision of a pilot restraint system to enable the pilot to withstand high acceleration during maneuvering, pilot escape or impact of crash landings.

Another object is the provision of a pilot restraint system that stabilizes heat variations, increases comfort, reduces fatigue, absorbs ultraviolet radiations, and prevents dehydration.

Another object is the provision of a pilot restraint system which provides the necessary pressurization for high altitude flight while eliminating the dangers of explosive decompression.

Another object is the provision of a pilot restraint system wherein the pilot is enclosed in a rigid housing completely filled with a non-compressible fluid and wherein volume expansion and contraction is provided to accommodate the pilot's change in fluid displacement in breathing.

Another object is the provision of a completely filled housing having a volume expansion breathing system operable during omni-directional acceleration.

Other objects and features of the present invention will be readily apparent to those skilled in the art from the following specification and appended drawings wherein is illustrated a preferred form of the invention, and in which:

FIGURE 1 is a plan view with parts broken away to illustrate the principles of the present invention, and FIGURE 2 is a vertical cross-sectional view.

Referring now to the drawings there is shown a fluid tight rigid container 10 adapted to provide a small clearance to a person encased therein. A fluid 11, such as a saline solution, completely fills the container and may be pumped in through inlet 12 after the person is in the container and the container is sealed. Suitable controls 13 are provided within the container whereby the person may operate the vehicle within which the container is housed. These controls may also operate breathing apparatus, communications equipment, or regulate the pressure and sealing of the container. A partially silvered view plate 14 is provided whereby the operator may view directly the area within angle 16. A reverse image instrument panel 17 is provided exteriorily of the container 10 at such a position that the operator may read the panel on the mirror portion 18 of the plate 14. The container has a transparent portion 19 in the view path so as not to obstruct the operator's vision.

Apparatus to permit breathing by the operator is mounted on the container. Here a pressure regulator 21 permits oxygen to be transmitted to the operator's face mask 22 through tube 23. As the operator inhales his chest expands. This increased body volume causes the fluid in the container to expand bellows 24 in the regulator to replace the oxygen in the regulator now inhaled by the operator. As the operator exhales, one way valve 26 prevents return of the air to the breathing chamber 27. Instead, a bypass path 28 forms the outlet. One way valve 29 in the bypass path prevents reverse flow of exhaled air when the operator inhales. As the bellows 24 contracts with the operator's exhalation of air, more oxygen enters the chamber 27 for the next breathing cycle. The breathing chambers 30, 30A should each be large enough to maintain a supply of oxygen at all times and to permit bellows expansion comparable to normal breathing of 31 cubic inches. Two breathing chambers 30, 30A diametrically opposite each other at the lung loaction, are required in order to permit breathing during omni-directional accelerations. For example, a lateral acceleration would produce a compressional force on one bellows while producing a compensating expansion force on the other bellows.

The container should be as small as possible to effect a savings of fluid weight. A one inch covering of water over a person's body weighs about 60 pounds. The container should be shaped to permit the operator to sit, stand or lie down, depending upon the desired configuration, the principal requirement being that the container is rigid.

Since blood has a density of 1.055 the "blood-pooling" of a water suspended person at (water density=1.0) 18 G's corresponds to that of a person unsupported at 1 G.

During acceleration the pressure of water against the direction of motion approximates that of the pressure of a person's blood as it is forced away from the direction of motion. Thus, water pressure at point 31 may be 300 ft. at 50 G's and the blood pressure at the same point would also be 300 ft. and the heart must perform only normal pumping requirements. The temperature of the water may be controlled to insulate the operator from extreme and adverse environmental temperatures.

Although the operator is in very restricted quarters, he nevertheless has freedom of limited movement and does not suffer the discomforts to which he would otherwise be subjected during acceleration. The upper limit of acceleration when using the principles of this invention is in the operator's ability to withstand fluid pressure against his chest, the lungs forming an air cavity which is the weakest acceleration resistant portion of the body.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. In a high altitude vehicle, a pilot restraint system comprising a liquid tight rigid housing container of such size as to receive an operator therein, a liquid having a density substantially the same as the density of the body of said operator and disposed within said container for completely surrounding said operator, said container having operator breathing apparatus for supplying oxygen to said operator and expelling exhaled air, and means for expanding the volume of said container to accommodate chest expansion of said operator in breathing.

2. A pilot restraint system for a high acceleration vehicle comprising a liquid tight rigid housing container of such size as to receive an operator therein, a liquid having a density substantially the same as the density of the body of said operator and disposed within said container for completely surrounding said operator, said container having operator breathing apparatus including a breathing chamber, an oxygen inlet to said chamber, a bellows diaphragm within said chamber and separating said liquid from said container from oxygen received in said chamber, a liquid tight mask adapted to be positioned over the operator's face, a passageway in communication with the portion of the chamber receiving oxygen for unidirectional flow of oxygen from said chamber to said mask, and a unidirectional path from said mask bypassing said chamber for expelling exhaled air.

3. A pilot restraint system for a high acceleration vehicle comprising a liquid tight rigid housing container of such size as to receive an operator therein, a liquid having a density substantially the same as the density of the body of said operator and disposed within said container for completely surrounding said operator, said container having operator breathing apparatus including a pair of laterally spaced, oppositely disposed, connected breathing chambers, bellows diaphragms within said chambers and separating liquid from said container from oxygen received in said chambers, a liquid tight mask adapted to be positioned over the operator's face, a passageway in communication with the portions of the chambers receiving oxygen for unidirectional flow of oxygen from said chambers to said mask, and a unidirectional path from said mask bypassing said chambers for expelling exhaled air.

4. A breathing apparatus operable independently of the direction of applied acceleration forces comprising a pair of laterally positioned, oppositely disposed breathing chambers connected to an oxygen source and mounted on opposite sides of a rigid container having an internal liquid pressure and an operator, said chambers each having a diaphragm therein separating oxygen received in said chambers from said pressure, a liquid tight mask adapted to be positioned over the operator's face, a passageway in communication with the portions of the chambers receiving oxygen for unidirectional flow of oxygen from said chambers to said mask, and a unidirectional path from said mask bypassing said chambers for expelling exhaled air, whereby an acceleration force tending to compress one of said diaphragms will tend to elongate the other of said diaphragms.

References Cited in the file of this patent

UNITED STATES PATENTS

| | | |
|---|---|---|
| 1,068,433 | Karamanos | July 29, 1913 |
| 1,099,814 | Miehoff | June 9, 1914 |
| 1,871,877 | Buckman | Aug. 16, 1932 |
| 2,228,115 | Holste | Jan. 7, 1941 |
| 2,539,284 | Thomas | Jan. 23, 1951 |